(12) United States Patent
Keener

(10) Patent No.: US 6,478,293 B2
(45) Date of Patent: Nov. 12, 2002

(54) CUTTING BOARD

(76) Inventor: Kit L. Keener, 140 Cheeskogili Way, Loudon, TN (US) 37774

( * ) Notice: Subject to any disclaimer, the term of this patent is extended or adjusted under 35 U.S.C. 154(b) by 0 days.

(21) Appl. No.: 09/908,353

(22) Filed: Jul. 18, 2001

(65) Prior Publication Data

US 2001/0040328 A1 Nov. 15, 2001

Related U.S. Application Data

(63) Continuation-in-part of application No. 09/787,596, filed on Jun. 11, 2001, which is a continuation-in-part of application No. PCT/US99/25794, filed on Nov. 2, 1999.
(60) Provisional application No. 60/107,194, filed on Nov. 5, 1998.

(51) Int. Cl.[7] .................................................. B23Q 3/00
(52) U.S. Cl. ..................... 269/289 R; 269/13; 269/15
(58) Field of Search ....................... 269/13, 15, 302.1, 269/289 R; 7/110, 170

(56) References Cited

U.S. PATENT DOCUMENTS

| | | | | |
|---|---|---|---|---|
| 3,598,164 A | * | 8/1971 | August | 269/13 |
| 5,626,067 A | * | 5/1997 | Lothe | 269/289 R |
| 6,371,470 B1 | * | 4/2002 | Ward | 269/289 R |

* cited by examiner

Primary Examiner—Robert C. Watson
(74) Attorney, Agent, or Firm—Howard & Howard

(57) ABSTRACT

An integrally formed polymeric cutting board comprising a horizontal cutting surface and an integral trough portion, a first arcuate vertical side wall having an arcuate upper lip portion extending above the cutting surface extending into the trough portion and an opposed vertical arcuate side wall having an upper edge coplanar with the cutting surface forming a truncated ellipsoid in planned view. The cutting surface is further supported by a central support member in the form of a tube having an upper end integral with the horizontal panel. The outer end wall of the trough portion is inclined outwardly and the cutting board includes a removable scoop configured to nest in the trough portion.

15 Claims, 2 Drawing Sheets

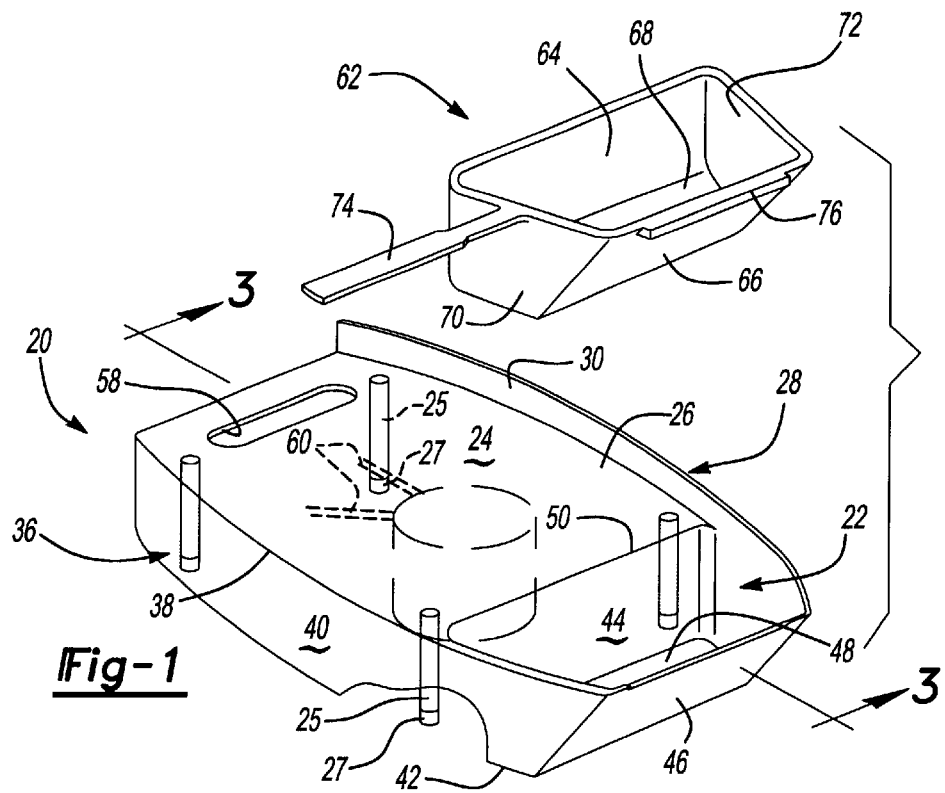
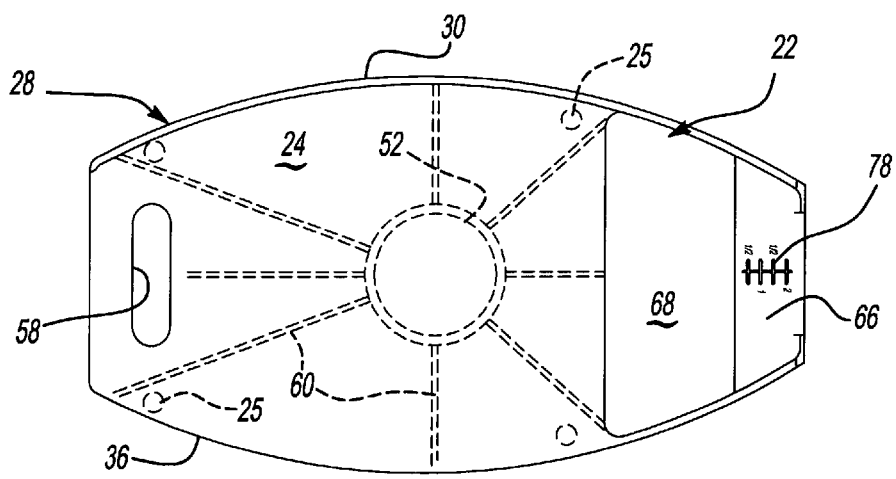
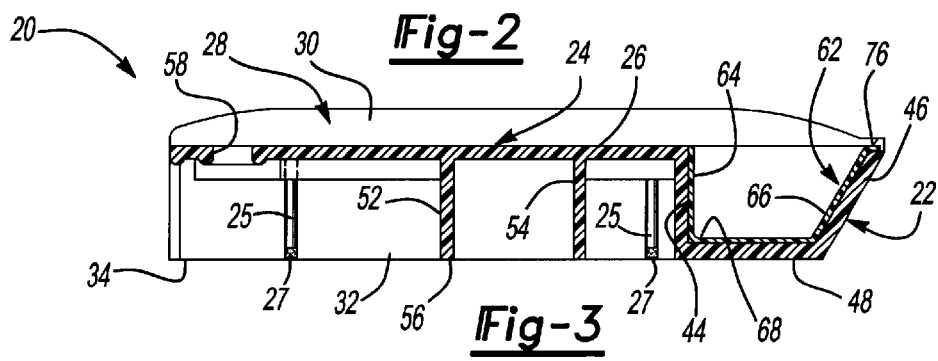

CUTTING BOARD

RELATED APPLICATIONS

This Application is a continuation in part application of U.S. application Ser. No. 09/787,596, filed Jun. 11, 2001, which is a continuation-in-part of patent cooperative treaty application PCT/US99/25794 filed Nov. 2, 1999, which claims priority to a U.S. provisional application Ser. No. 60/107, 194 filed Nov. 5, 1998.

BACKGROUND OF THE INVENTION

This invention relates to a cutting board of simple rugged construction having a trough integrally molded with the cutting surface and which provides for ease of use in cutting and collection of food and fluid in the trough portion.

Prior cutting boards having included an opening for an elongated slot positioned above a receptacle or reservoir for collecting food and fluids produced during carving or cutting. These prior cutting boards, however, have several shortcomings. For example, the opening in the cutting board is difficult to clean, reduces the useful work or cutting surface of the cutting board and limits the size of cuttings which may be passed through to the receptacle. Depending upon the purpose of the cutting operation, the cut material must be removed from the trough for measuring or the board must be tipped to remove waste. There is a need, therefore, for a cutting board which is simple and rugged in construction and which provides for ease of use and removal of cut material.

SUMMARY OF THE INVENTION

The cutting board of this invention may be integrally formed from a suitable polymer which includes a horizontal panel having an upper cutting surface and an integral trough. The horizontal panel includes first and second sides and first and second ends. A vertical arcuate side wall is integral with the first side of the horizontal panel including an upper arcuate lip portion extending above the cutting surface and into the integral trough which provides for easy sweeping of cut or carved material into the trough. The integral arcuate side wall further includes a lower support portion having a lower edge supporting the first side of the horizontal panel. The cutting board further includes a second vertical side wall integral with the second side of the horizontal panel, which is preferably also arcuate and opening toward the first vertical side wall, having an upper edge coplanar with the cutting surface and a lower edge coplanar with the lower edge of the first vertical side wall which supports the second side of the horizontal panel.

The integral trough portion is defined by the opposed first and second vertical side walls, such that material cut or carved on the cutting surface may be swept along the arcuate lip into the trough, as set forth above. The trough further includes integral opposed end walls each having side edges integral with the first and second vertical side walls and a bottom wall which is preferably coplanar with the lower edges of the first and second vertical side walls. In the most preferred construction, the first end wall of the trough is integral with and extends perpendicular to the horizontal panel and the second opposed end wall is inclined outwardly to catch material swept from the cutting surface. In the most preferred embodiment, the cutting board further includes a tubular support member having an upper end integral with the horizontal panel, generally midway between the sides and ends of the horizontal panel and a lower end coplanar with the lower edges of the first and second vertical side walls.

In the most preferred embodiment, the cutting board of this invention further includes a scoop which nests into the trough for collection of material swept from the cutting surface. In the preferred embodiment, the scoop includes opposed first and second end walls, wherein one of the end walls is inclined to nest within the trough having a lip supported on the inclined wall of the trough. The scoop further preferably includes a handle and volume indicia to indicate the volume of material swept into the scoop.

Other advantages and meritorious features of the cutting board of this invention will be more fully understood from the following description of the preferred embodiments, the appended claims and the drawings, a brief description of which follows.

BRIEF DESCRIPTION OF THE DRAWINGS

FIG. 1 is a top elevation of the cutting board of this invention and a scoop.

FIG. 2 is a top view of the cutting board and scoop illustrated in FIG. 1;

FIG. 3 is a side cross sectional view of FIG. 1 in the direction of view arrows 3—3;

DETAILED DESCRIPTION OF A PREFERRED EMBODIMENT

Figure 4:
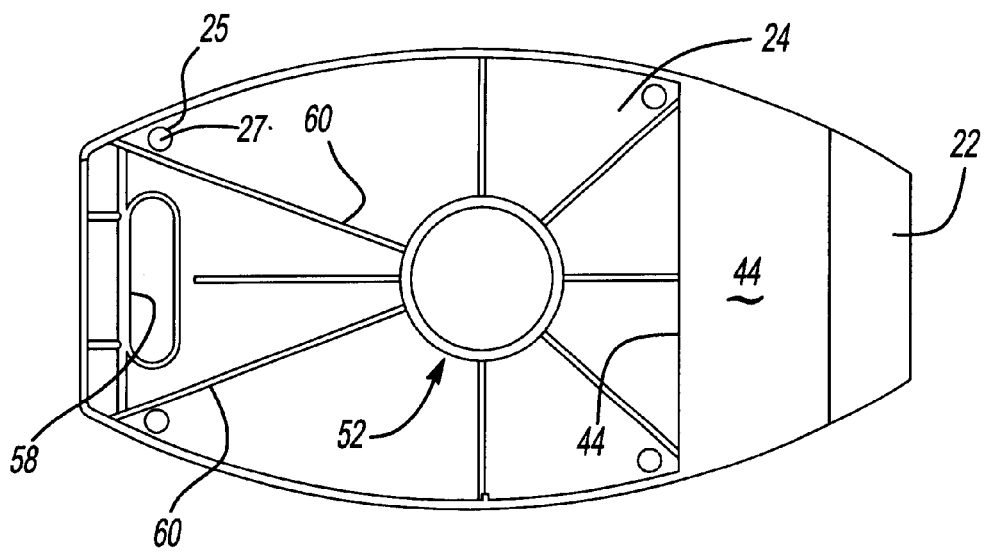
FIG. 4 is a bottom view of FIG. 1.
Figure 5:
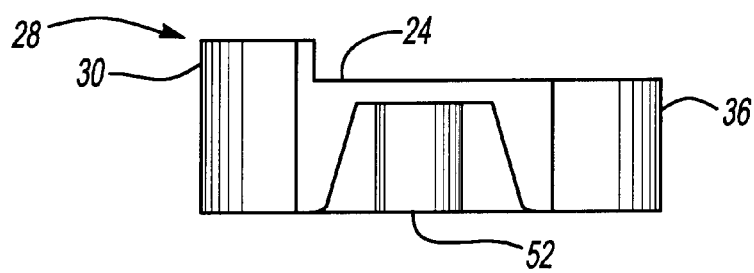
FIG. 5 is an end view of FIG. 1.
Figure 6:
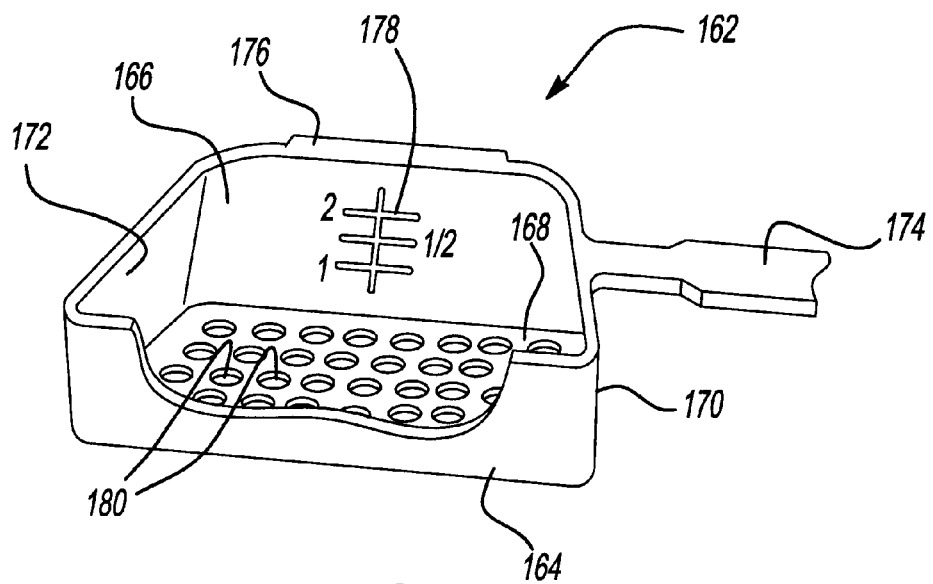
FIG. 6 is a top elevation partially cut away illustrating an alternative embodiment of the scoop.

The preferred embodiment of the cutting board 20 shown in FIGS. 1 to 5 is integrally formed as by injection molding a food quality polymer, such as polyethylene, polypropylene, etc. The cutting board 20 includes an integral trough portion 22 as described below. The cutting board includes a horizontal panel 24 having an upper cutting surface 26 for cutting, carving or filleting food products. The cutting board further includes a first vertical arcuate side wall 28 integral with the horizontal panel 24 including an arcuate upper lip portion 30 extending above the cutting surface 26 of the horizontal panel 24 which continues into the integral trough portion as shown in FIG. 1 which assists sweeping of food products into the trough portion 22. The first vertical side wall 26 further includes a lower support portion 32 as shown in FIG. 3 having a planar lower edge 34. The cutting board further includes a second vertical side wall 36 having an upper edge 38 integrally formed with the horizontal panel 24 and coplanar with the cutting surface 26. The lower portion 40 of the second vertical side wall includes a planar lower edge 42 which is coplanar with the lower edge 34 of the first vertical side wall. In the preferred embodiment, the second vertical side wall 36 is also arcuate, opening toward the arcuate first side wall 28, forming a truncated ellipse as best shown in FIGS. 1 and 2, which provides a very stable cutting surface and which is attractive in appearance.

The trough portion 22 is defined by the first and second vertical side walls 28 and 36, respectively, first and second opposed end walls 44 and 46, respectively, and bottom wall 48. The side edges of the first and second walls 44 and 46 are integral with the first and second vertical side walls 28 and 36 forming an integral assembly. The upper edge 50 of the first end wall 44 is integral with an end portion of the horizontal panel 24 and coplanar with the cutting edge 26 as shown in FIG. 1. In the preferred embodiment of the cutting board 20, the second end wall 46 is inclined outwardly from